(No Model.)
W. A. McCALLUM.
JOINTED POST AND MANUFACTURE OF THE SAME.
No. 443,053.  Patented Dec. 16, 1890.
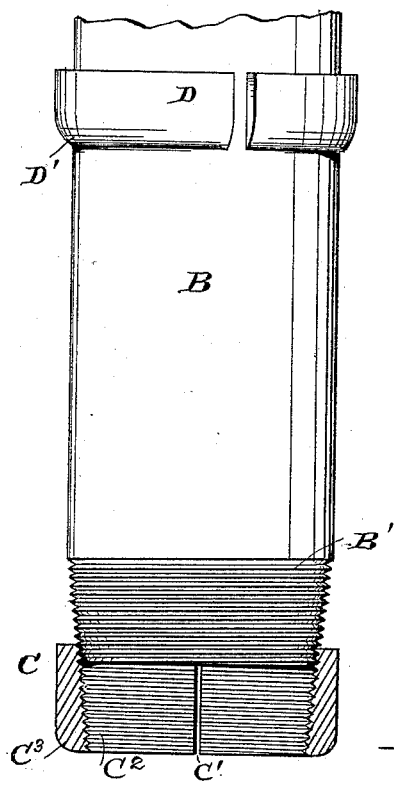
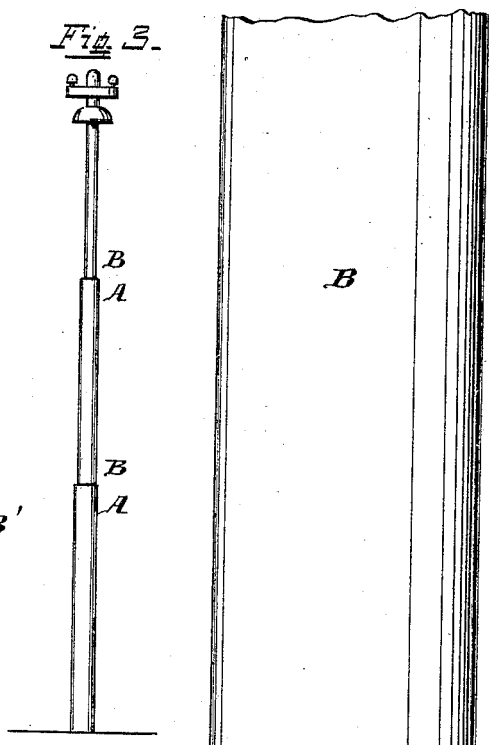
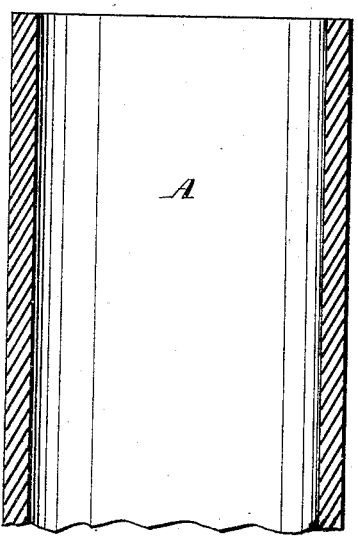
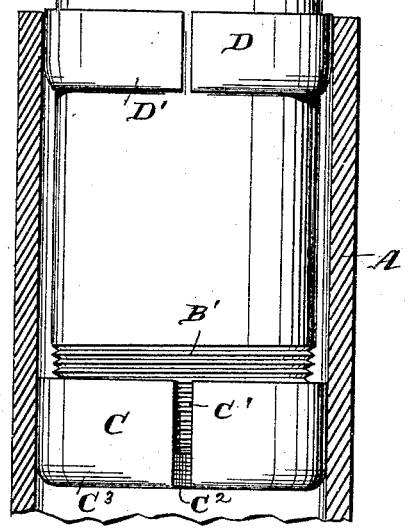
Attest
H. Smith
Wt E. Jones
Inventor
William A. McCallum
per Wm. Hubbell Fisher
Atty.

UNITED STATES PATENT OFFICE.

WILLIAM A. McCALLUM, OF CINCINNATI, OHIO, ASSIGNOR TO WM. KIRKUP & SON, OF SAME PLACE.

JOINTED POST AND MANUFACTURE OF THE SAME.

SPECIFICATION forming part of Letters Patent No. 443,053, dated December 16, 1890.

Application filed February 27, 1890. Serial No. 342,024. (No model.)

*To all whom it may concern:*

Be it known that I, WILLIAM A. MCCALLUM, a citizen of the United States, and a resident of the city of Cincinnati, in the county of Hamilton and State of Ohio, have invented certain new and useful Improvements in Jointed Posts and in the Manufacture of the Same, of which the following is a specification.

The several features of my invention and the various advantages resulting from their use, conjointly or otherwise, will be apparent from the following description and claims.

In the accompanying drawings, making a part of this specification, and to which reference is hereby made, Figure 1 shows the ends of the two adjacent sections of pipe or tubing in position to be connected, the annular screw-shim being on the end of the pipe-section of the smaller diameter. The pipe-section of larger diameter destined to receive said shim and annular screw-shim are shown in section, the said section being a central one taken through a plane passed through the axial center of the shim and through the axial center of the pipe-section of larger diameter. The pipe-section of smaller diameter and the annular collar are shown in elevation. Fig. 2 shows the same parts after being connected together. In this figure all of the parts are shown in elevation, except the pipe-section of larger diameter. The latter is shown in longitudinal section, this section being taken in a plane passing through the axial center of the said pipe. Fig. 3 is an elevation of a pole or post composed of sections of pipe or tubing after having been united by my invention.

The posts to which my invention relates are those made of sections of wrought-iron tubing. These posts may be said to be of a form tapering from the bottom toward the top. At and near the bottom the post is of greater diameter than at the top, for the manifest reason that the lower portion of the post is subjected to a greater lateral or breaking strain than is the upper portion. Furthermore, the lower portion of the post has to support not only its own weight, but also the weight of the superincumbent portion.

The iron post is composed of lengths or sections of wrought-iron pipe. Each length is of a different diameter than the adjacent length to which it is connected.

I will now proceed to describe my invention in detail.

A indicates the pipe of larger diameter, and B indicates the pipe of smaller diameter.

C indicates an annular screw-shim.

On that end of pipe B which is to enter pipe A is cut a screw-thread B'. The exterior portion of pipe B at and near its said end is beveled (preferably by the dies in cutting the screw hereinafter mentioned) inwardly toward the end of said pipe and toward the extended longitudinal axis of said pipe. In other words, the exterior portion of said pipe at and near its end tapers smaller toward said end, substantially as shown in Figs. 1 and 2. The screw-thread B' is cut thereon and consequently forms a tapering screw.

The exterior diameter of the shim C is preferably slightly greater than the interior diameter of the larger pipe A. The shim is, at one point C', cut through transversely, a portion of the metal there being cut away, leaving a slot C' extending across the shim. This slot C' allows the shim to readily expand when pressed outwardly, as hereinafter specified. The interior of this annular shim C is provided with a screw-thread $C^2$, whose teeth have the same pitch as those of the screw B' of pipe B. The interior of the annular shim tapers from end to end. The interior of the shim at that end of it which is next the pipe B in Fig. 1 is larger than the diameter of the interior space inclosed at the other or forward end of the shim. The screw-thread $C^2$ will consequently form an interior screw tapering smaller toward the front end of the shim. The periphery of the forward end of the screw B'—that is to say, the end of the pipe B—is of a diameter a little less than the interior of the shim at its rear end—viz., at that end which is adjacent to the end of pipe B in Fig. 1.

The relative diameters of the periphery of the extreme front end of the pipe B and the diameter of the rear space inclosed by the screw $C^2$ are such that the screw B' can enter the annular shim C and engage one or two turns of the screw $C^2$ before the screw $C^2$ shall begin to act as a wedge to enlarge the shim C. The outer edge of the forward end of the shim is beveled or preferably rounded, as shown at $C^3$, in order to more easily be guided into the open end of the larger pipe A.

In practice the parts heretofore described are united as follows: A loose split collar D, whose outer edge toward pipe A has a bevel D′, is first slipped over the end of pipe B and passed backward to the place it occupies in Fig. 1. The end of pipe B is now screwed into the adjacent end of the annular shim C until the thread of shim C tightens on that of B′. Should the shim not be slightly larger than the interior of the larger pipe A, the diameter of the periphery of the shim is enlarged by screwing the pipe B into the shim. The shim is to be sufficiently larger than the interior of pipe A, either in its first manufacture or by screwing pipe B into it, as that when driven into pipe A it will press so tightly against the latter as that the friction of pipe A on the shim will prevent the latter turning while the pipe B is being screwed into the shim, as hereinafter specified. The parts C and B now occupy the relative position shown in Fig. 1. The pipe B, carrying on its end the annular screw-shim C, is now advanced toward the open end of pipe A and is pressed into said end. The rounded edge $C^3$ of the shim C facilitates the introduction of the shim into the pipe A and the slit in the shim allows it to be elastically contracted, so as to enter pipe A without splitting the latter. Power applied to pipe B forces the shim into the pipe A and carries it (said shim) to its predetermined place in pipe A. Its relative location, when thus forced to place, is shown in general in Fig. 2. The pipe A is now held stationary and the pipe B revolved, or vice versa, or both pipes may be simultaneously revolved in contrary directions. The revolution of the pipe or pipes will be in such a direction as to cause pipe B to be screwed into the shim C. As the pipe B is screwed into the shim C, the wedge-shaped formation of the screw on pipe B and in the shim operates to steadily expand the shim with great force and wedge it between the inner surface of the pipe A and the outer surface of pipe B. The force with which it is thereby expanded is so great that if continued it will cause the toughest wrought-iron pipe to bulge over the periphery of the shim. By the operation of screwing the pipe B into the shim the latter is made fast at the desired point within pipe A, and the pipe B is thereby fixed thereto. All that now remains to be done is to move the split collar over pipe B till the beveled edge D′ of said collar enters the pipe A. The split collar is then forcibly pressed forward into pipe A until it is firmly wedged between the pipes B and A. The two pipes are thus firmly united and there is no opportunity for lateral deflection of the one in relation to the other. The union of these pipes has been made without cutting a screw-thread on the interior of the large pipe, and without any special measurements and special fitting, both of which latter operations consume much time and labor. The joint made by my invention is immovable under all the force, either vertical or lateral, to which such posts are subjected. The joint is certain to be firm and allows no play for the pipe B within the pipe A.

All of the aforesaid variations in the diameter of the pipe A and also of the pipe B are provided for, the annular screw-shim C in connection with the beveled screw-thread on pipe B readily accommodating itself to these variations, and thereby invariably insuring a tight and solid union between the two pipes A and B.

The bevel on the interior of the screw-shim may be omitted, the bevel or taper of the screw B′ being retained, or vice versa; but the operation of the device is more satisfactory where both the end of pipe D and the interior of the shim are beveled, as I obtain a wedged movement of double extent, and the flat periphery of the shim presses everywhere more equally against the interior of pipe A.

What I claim as new and of my invention, and desire to secure by Letters Patent, is—

1. The combination of the pipe A, annular slotted shim having a screw-thread, and the pipe B, having an exterior screw-thread, one of the screws being on a bevel, substantially as and for the purposes specified.

2. The combination of pipe A, annular slotted screw-shim, and the pipe B, having beveled screw B′, substantially as and for the purposes specified.

3. The combination of pipe A, pipe B, having at its end the exterior tapering screw B′, and the annular slotted shim C, having interiorly the tapering screw C′, engaging the screw-thread on pipe B, the shim being located within the pipe A, substantially as and for the purposes specified.

4. The combination of pipe A, pipe B, having at its end the exterior tapering screw B′, and the annular slotted shim C, having interiorly the tapering screw C′, engaging the screw-thread on pipe B, the shim being located within the pipe A, and collar D, located at the mouth of pipe A and wedged between pipes B and A, substantially as and for the purposes specified.

5. An iron post composed of pipe-sections, each section receiving into it the lower end of the one above it, the said lower end being united to the section in which it is located by an annular slotted screw-shim whose interior screw-thread engages the tapered screw on the end of the said lower end, substantially as and for the purposes specified.

WILLIAM A. McCALLUM.

Attest:
K. SMITH,
A. L. HERRLINGER.